United States Patent [19]

Nagano

[11] Patent Number: 4,743,222
[45] Date of Patent: May 10, 1988

[54] SPEED CONTROL DEVICE FOR A BICYCLE

[75] Inventor: Masashi Nagano, Izumi, Japan

[73] Assignee: Shimano Industrial Company Limited, Osaka, Japan

[21] Appl. No.: 890,722

[22] Filed: Jul. 30, 1986

[30] Foreign Application Priority Data

Aug. 2, 1985 [JP] Japan .............................. 60-171320
Jul. 25, 1986 [JP] Japan .............................. 61-176406

[51] Int. Cl.⁴ .......................... F16H 9/10; F16H 9/02
[52] U.S. Cl. ........................................ 474/56; 474/49
[58] Field of Search ................ 474/49, 50, 54, 56, 474/57, 78, 80, 81

[56] References Cited

U.S. PATENT DOCUMENTS

| | | | |
|---|---|---|---|
| 3,956,944 | 5/1976 | Tompkins | 474/54 |
| 3,969,948 | 7/1976 | Pipenhusen, Jr. | 474/57 |
| 4,521,207 | 6/1985 | Husted | 474/56 |
| 4,645,475 | 2/1987 | Husted | 474/49 |

FOREIGN PATENT DOCUMENTS

3609505 10/1986 Fed. Rep. of Germany .
57111698 7/1987 Japan .

*Primary Examiner*—Stephen J. Novosad
*Assistant Examiner*—William P. Neuder
*Attorney, Agent, or Firm*—Stevens, Davis, Miller & Mosher

[57] ABSTRACT

A speed control device for a bicycle having a positioning mechanism provided with a first positioning portion having engaging portions corresponding in number to the speed change stages, a second positioning portion having engaging portions larger in number than the engaging portions of the first positioning portion, and at least one engaging member engageable with the respective engaging portions of the first and second positioning portions, thereby enabling the number of speed change stages set by the positioning mechanism to be changed by selecting engagement with one of the first and second positioning portions.

17 Claims, 9 Drawing Sheets

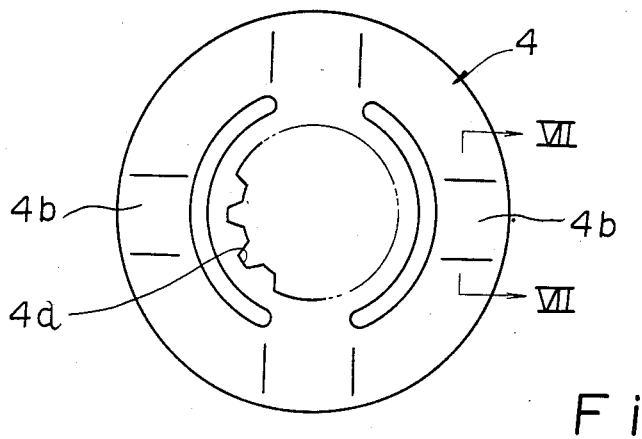
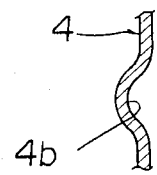
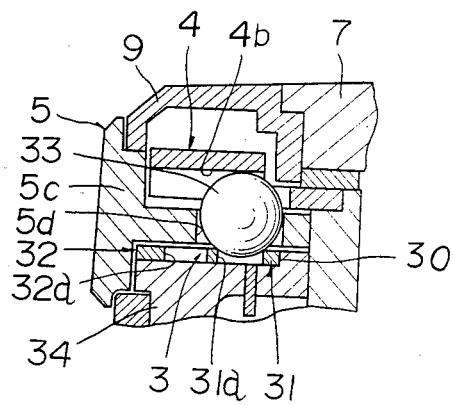
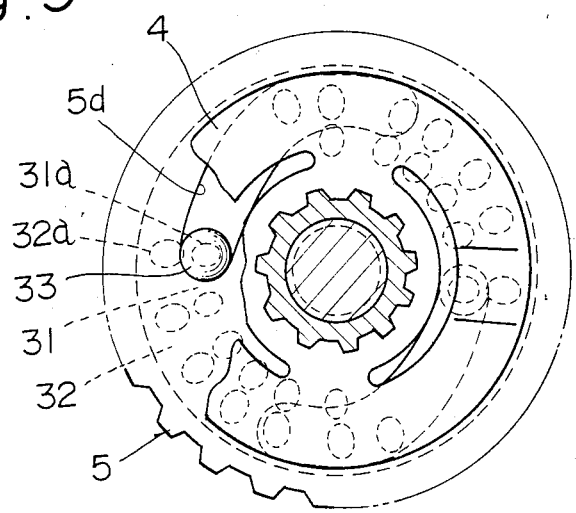

SPEED CONTROL DEVICE FOR A BICYCLE

FIELD OF THE INVENTION

This invention relates to a speed control device for a bicycle, and more particularly, to a speed control device for a bicycle, which is used together with a derailleur which shifts a driving chain to a desired sprocket of a multistage sprocket assembly, so that a control lever is operated to actuate the derailleur through a control wire, thereby changing the bicycle speed to a desired speed change stage.

DESCRIPTION OF THE PRIOR ART

Conventionally, the above type of speed control device is is well-known and is described in Japanese Utility Model Laid-Open Gazette No. Sho 57-111,698. This type of device is provided with a positioning mechanism comprising a positioning member rotatable in association with the lever body and having a plurality of engaging portions corresponding to the speed change stages of the derailleur and an engaging member supported to a fixing member supporting the lever body and engageable with one of the engaging portions, so that the positioning mechanism reliably positions the lever body at the desired speed change stage.

The engaging portions at the positioning member are set in number and pitch corresponding to the speed change stages at the derailleur, in other words, to the configuration of the multistage sprocket assembly, whereby the aforesaid positioning mechanism is not usable together with a multistage sprocket assembly having a different sprocket configuration.

Therefore, various kinds of speed control devices having positioning mechanisms different in number and pitch corresponding to various sprocket configurations at the multistage sprocket assembly have hitherto been used.

In the light of above, the present invention is provided with an object thereof being to provide a speed control device which uses a positioning member provided with first and second positioning portions having engaging portions which are different in number, so that the positioning portions at the positioning member can be selected in order to change the speed change stages to be set by the positioning mechanism. Hence, one speed control device is usable corresponding to two kinds of multistage sprocket assemblies and also the first or the second positioning portion only is selectively operated in a simple manner to thereby enable the set speed change stages to be changed.

SUMMARY OF THE INVENTION

A speed control device according to the invention is provided with a fixing member, a lever body supported rotatably with respect thereto, and a positioning mechanism for the lever body. The positioning mechanism is provided with a first positioning member with a first positioning portion having engaging portions corresponding in number to the speed change stages at a derailleur and a second positioning portion having engaging portions larger in number than those at the first positioning portion. At least one engaging member is provided which is engageable with each engaging portion at the first and second positioning portions. A switching means is provided for selecting the first or the second positioning portion to change the number of the speed change stages to be set by the positioning mechanism.

Accordingly, the speed control device of the present invention selects the first positioning portion to allow the engaging member to engage with one of the engaging portions at the first positioning portion, so that the lever body is rotatably operated to enable the bicycle speed to be changed at, for example, six stages, or selects the second positioning portion to allow the same to engage with one of the engaging portions at the second positioning portion, so that the lever body is rotatably operated to enable the bicycle speed change at seven stages.

In addition, the first and second positioning portions in the present invention may be disposed radially, circumferentially, or axially, with respect to the axis of rotation of the lever body. Also, the first positioning portion and second positioning portion may be included in one positioning member or in separate positioning members. The switching means, which selects the first or second positioning portion, preferably uses an operating member to move the engaging member for engagement with the engaging portion at each positioning portion. Alternatively, the present invention may include a clutch means, or may move the positioning member instead of the engaging member.

In either embodiment, the speed control device of the present invention employs a positioning member provided with a first positioning portion having engaging portions corresponding in number to the speed change stages at the derailleur and a second positioning portion having engaging portions larger in number than those at the first positioning portion, and at least one engaging member 33 engageable with each engaging portion at both positioning portions. As a result, the first or second positioning portion is selected to change the number of the speed change stages, thereby enabling the use of one speed control device corresponding to two kinds of multistage sprocket assemblies, thus providing a speed control device which is very economical.

Moreover, the first or the second positioning portion is simply selected to enable easy change of speed change stages set by the positioning mechanism, thereby facilitating proper use in different modes.

Also, in the present invention, in an embodiment where the engaging member is moved with respect to the first and second positioning portions, a friction zone is provided on the zone of movement of the engaging member, so that the engaging member, which is biased by a biasing means toward the engaging portions, is utilized to apply to the lever body a friction force overcoming a return spring at the derailleur, thereby enabling the speed change stage to be maintained by the friction force along with the positioning mechanism which sets and maintains the speed change stage.

The above and further objects and novel features of the invention will be more fully apparent from the following detailed description when the same is read in connection with the accompanying drawings.

BRIEF DESCRIPTION OF THE DRAWINGS

FIG. 5 is a plan view of a leaf spring only of the FIG. 1 embodiment, FIG. 6 is a partially cutaway side view of the leaf spring, FIG. 7 is a sectional view taken on the line VII—VII in FIG. 5, FIGS. 8 and 9 are views illustrating changing of the speed change stages set by the positioning mechanism.

DETAILED DESCRIPTION OF THE INVENTION

Figure 1:
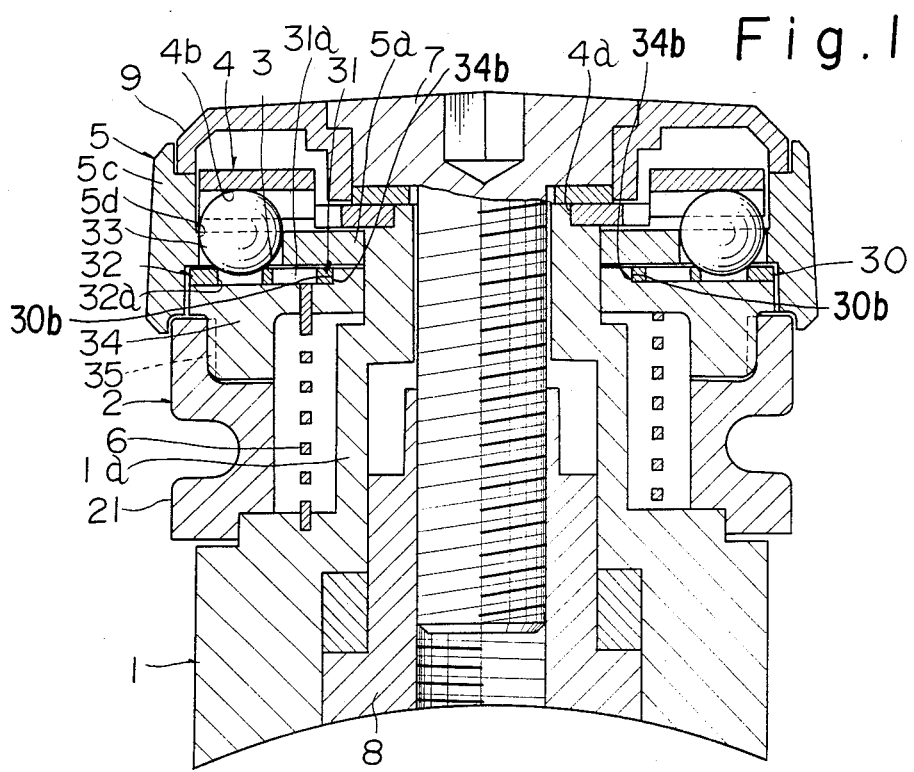
FIG. 1 is a longitudinal sectional view of a first embodiment of a speed control device of the invention.

A speed control device shown in FIG. 1 is provided with a fixing member 1 having a cylindrical lever shaft 1a, a lever body 2 supported rotatably thereto, and a positioning mechanism 3 therefor. The fixing member 1 is welded or fixed through a fixing means to the bicycle frame, and the lever body 2 comprises a cylindrical boss 2a and a control portion (not shown) extending radially outwardly from one side thereof.

Figure 2:
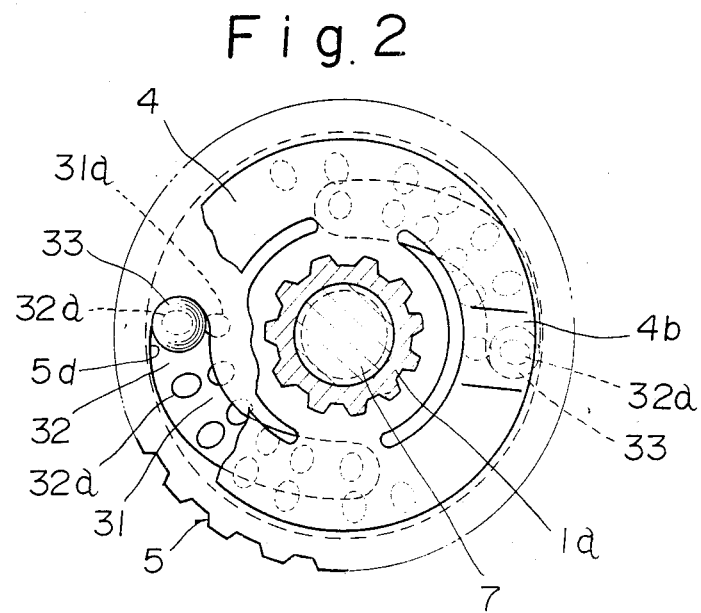
FIG. 2 is a cross-sectional plan view of the FIG. 1 embodiment.
Figure 3:
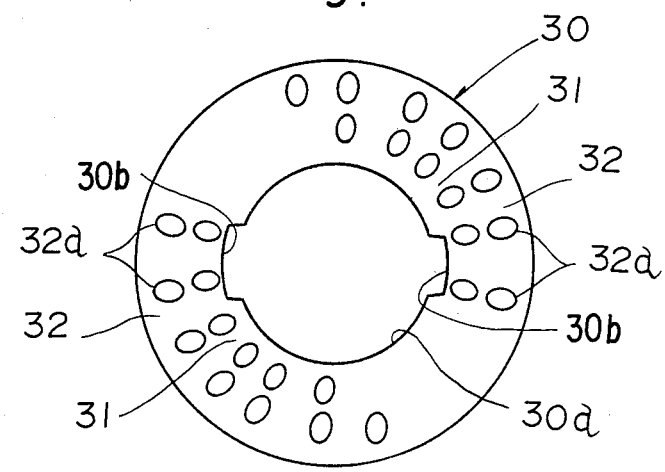
FIG. 3 is a plan view of a positioning member of the FIG. 1 embodiment.

The positioning mechanism 3 in a first embodiment of the speed control device of the invention shown in FIGS. 1 through 9, is provided with a plate-like positioning member 30 provided with a first positioning portion 31 having engaging portions 31a corresponding in number (six in the drawing) to the speed change stages at a derailleur for a bicycle, and a second positioning portion 32 having engaging portions 32a larger in number (seven in the drawing) than engaging portions 31a, and engaging members 33 engageable with the engaging portions 31a and 32a respectively. The first and second positioning portions 31 and 32, as shown in FIGS. 2 and 3, are disposed on the positioning member 30 radially inwardly and outwardly thereof with respect to the lever shaft 1a. The positioning member 30 is coupled with a support 34 through a non-round bore 30a (e.g., as shown in FIGS. 1 and 3 positioning member 30 has recesses 30b which interlock with projections 34b of support member 34 to allow them to rotate in concert) and is supported rotatably to the lever shaft 1a through the support 34. Positioning member 30 is rotatable integrally with the lever body 2 through an associate portion 35 which couples support member 34 to lever body 2 to allow the support member and the positioning member to rotate with the lever body 2. The engaging members 33 are biased by a leaf spring 4 toward the engaging portions 31a and 32a, thereby being elastically engageable therewith respectively. Also, the positioning mechanism 3 is provided with a switching means whih shifts each engaging member 33 radially of the positioning portions 31 and 32, so that the engaging member 33 selects the first positioning portion 31 or the second positioning portion 32.

In the aforesaid construction, six engaging portions 31a at the first positioning portion 31 are juxtaposed circumferentially thereof at a pitch corresponding to the sprocket configuration at, for example, a six stage speed change sprocket assembly. Seven engaging portions 32a at the second positioning portion 32 are juxtaposed circumferentially thereof at a pitch corresponding to the sprocket configuration at, for example, a seven stage speed change sprocket assembly. In addition, it is preferable that the top engaging portions 31a and 32a at the first and second positioning portions 31 and 32 are disposed on the same straight radial line, thereby allowing each engaging member 33 to selectively engage with the top engaging portion 31a or 32a so as to change the number of speed change stages. The engaging portions 31a and 32a are formed of through bores, and may alternatively be recessed, which are not particularly defined or limited in their configuration. The engaging portions 31a and 32a, which are separate from each other, may alternatively be continuous or connected by a slot at each speed change stage. In this case, for example, a plurality of slots extending radially of the positioning member 30 are provided, circumferentially thereof at regular intervals, each slot forming at one end the engaging portion 31a and at the other end the engaging portion 32a.

Each engaging member 33 preferably uses a ball, but may use a roller or other means. Also, the engaging member 33 may be integral with the leaf spring 4, thereby being not particularly defined or limited in its configuration.

The leaf spring 4, as shown in FIGS. 5 and 6, is formed as a disc having at its center a non-round bore 4a to be fitted onto the utmost end of lever shaft 1a and is provided at its portions opposite to the engaging member 33 with semicylindrical portions 4b. Also, the leaf spring 4 is prevented from rotating together with the positioning portions 31 and 32 by virtue of the fitting of bore 4a onto the lever shaft 1a, thereby holding each engaging member 33 in position. Each holding portion 4b of a semicylindrical shape restrains the engaging member 33 from moving circumferentially of the positioning member 30, but allows it to move radially. In addition, each holding portion 4b may be in the form of an elongate slot.

Figure 4:
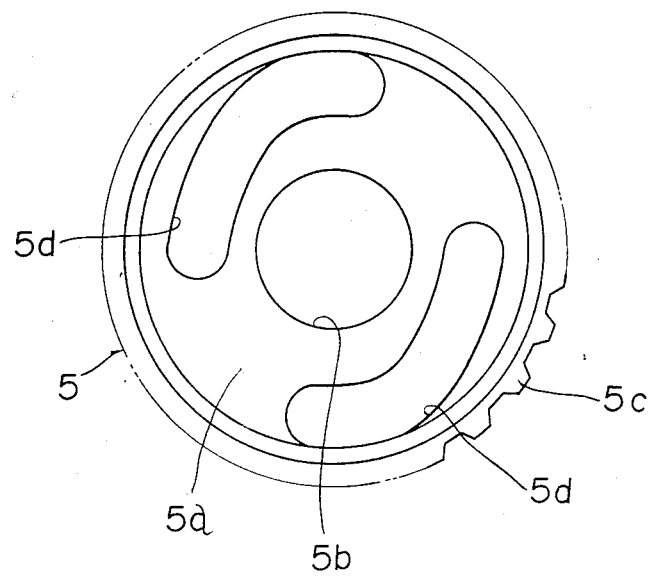
FIG. 4 is a plan view of an operating member of the FIG. 1 embodiment.

The operating member 5, as shown in FIG. 4, comprises a disc 5a having at its center a through bore 5b fitted rotatably onto the lever shaft 1a and a cylindrical operating portion 5c provided at the outer periphery of the disc 5a. Disc 5a is provided with guide bores 5d extending circumferentially and radially inwardly from the opposite portions to the engaging member 3, so that the engaging members 33 are adapted to move only radially of the positioning member 30 along each holding portion 4b by means of the rotation of operating member 5.

In FIG. 1, reference numeral 6 designates a compensation spring provided between the support 34 and the fixing member 1, which biases the positioning member 30 reversely to the biasing direction of the return spring at the derailleur. Reference numeral 7 designates a mounting screw which screws with a threaded bore provided at a base 8 fixed to the bicycle frame to thereby fix the fixing member 1 thereto, and reference numeral 9 designates a cover covering the positioning mechanism 3.

Referring to FIGS. 1 and 2, the first embodiment constructed as described above is in the mode where the engaging members 33 engage with the engaging portions 32a at the second positioning portions 32, thereby enabling the seven stage speed change.

In this mode, the lever body 2 is rotated and the positioning member 30 rotates in association therewith, so that one of the engaging portions 32a at the second positioning portion 32 engages with the engaging member 33, thereby enabling the seven stage speed change.

When the number of speed change stages set by the positioning mechanism 3 is changed from seven to six, the operating member 5 is rotated clockwise in FIG. 2 in condition of keeping the engaging member 33 in engagement with the top engaging portion 32a. Hence, an operating force of the operating member 5 acts on the engaging member 33 through the guide bore 5d, whereby the engaging members 33 move radially inwardly of the second positioning portions 32 along the holding portions 4b so as to disengage from the engaging portions 32a. Then, the engaging members 33, as shown in FIGS. 8 and 9, engage with the engaging portions 31a at the first positioning portion 31, thereby changing the number of speed change stages to six.

In this mode, when the lever body 2 is rotated, the positioning portions 31 and 32 rotate in association with the rotation of lever body 2, so that one of the engaging portions 31a at the first positioning portion 31 engages with the engaging member 33, thereby enabling the six stage speed change.

In a case where the number of speed change stages set by the positioning mechanism 3 is changed from six to seven, the operating member 5 is rotated counterclockwise in FIG. 9 in condition of keeping the engaging member 33 in engagement with a top engaging portion 31a. The operating force of the operating member 5 acts on the engaging member 33 through the guide bore 5d, so that each engaging member 33 moved radially outwardly of the first positioning portion 31 along the holding portion 4b of leaf spring 4 and disengages from the engaging portion 31a and then reengages with the engaging portion 32a as shown in FIGS. 1 and 2, thereby changing the bicycle speed at the seven stages.

Figure 10:
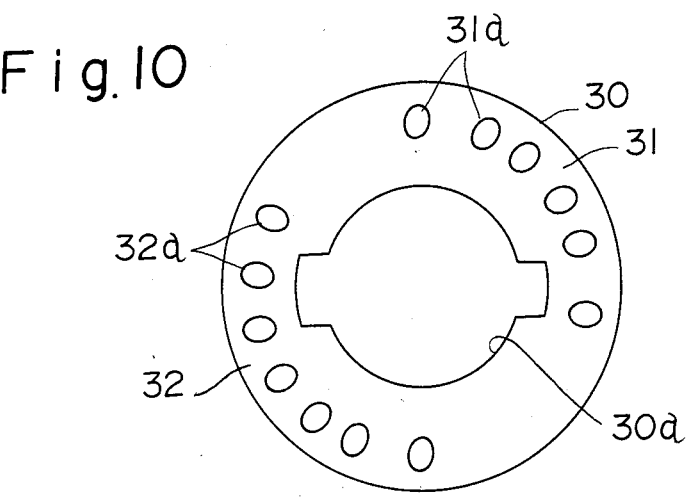
FIG. 10 is a plan view of positioning member in a second embodiment of the invention.
Figure 12:
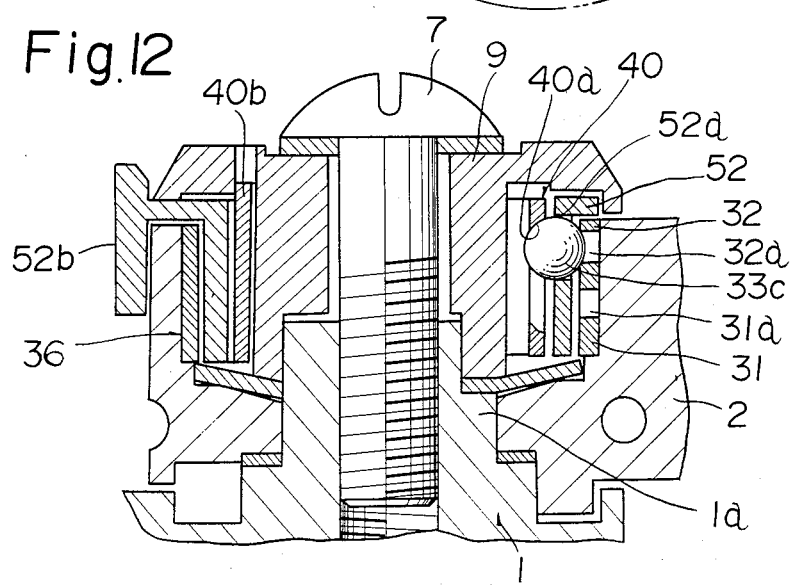
FIG. 12 is a partial longitudinal sectional view of a third embodiment of the invention.
Figure 13:
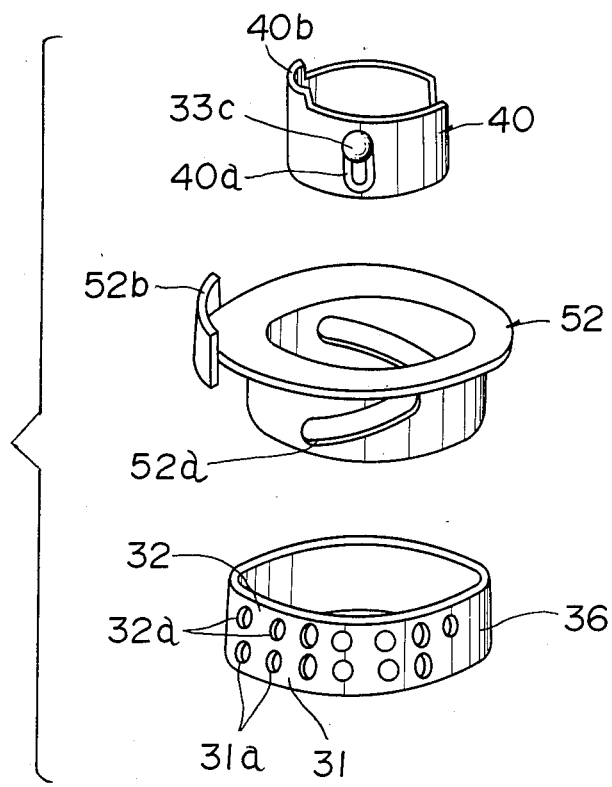
FIG. 13 is a perspective exploded view of the principal portion at the third embodiment in FIG. 12.

Alternatively, the first and second positioning portions 31 and 32 may be displaced circumferentially of the positioning member 30 as shown in FIG. 10, or displaced axially of a positioning member 32 as shown in FIGS. 12 and 13.

A second embodiment of the invention shown in FIG. 10 disposes a plurality of engaging portions 31a of the first positioning portion 31 and a plurality of engaging portions 32a of the second positioning portion 32 circumferentially of the positioning member 30 and concentrically relative to each other.

In this case, the switching means, the same as in the first embodiment, employs an operating member 51 supported rotatably to the lever shaft 1a, the operating member 51 holding one engaging member so that the operating member 51 is rotated to selected the first or the second positioning portion. Besides this, as shown in FIG. 11, two engaging members 33A and 33B may be used corresponding to the first and second positioning portions 31 and 32 and an operating member 51 constituting the switching means may be provided with guide bores 51a and 51b which guide the engaging members 33A and 33B and shift them toward the engaging position and the disengaging position thereof.

Figure 11:
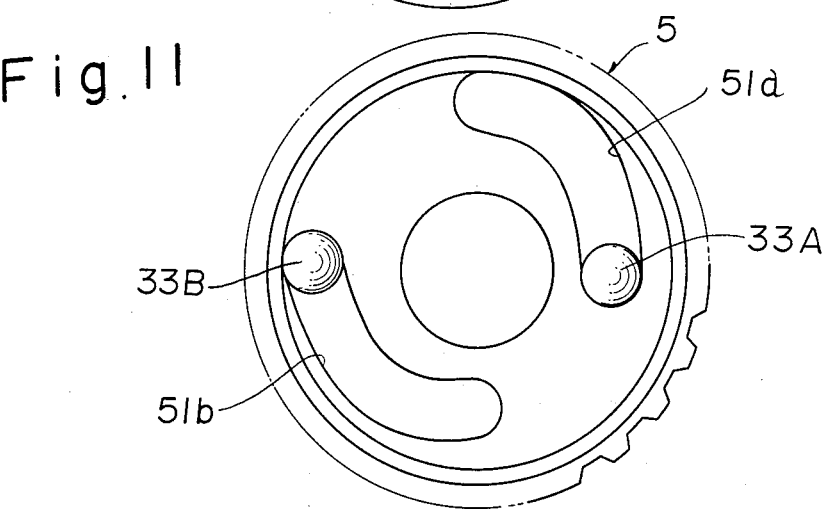
FIG. 11 is a plan view of an operating member applied to the second embodiment.

In this case, when the operating member 51 is rotated clockwise in FIG. 11, the engaging member 33B positioned at the second positioning portion 32 is guided toward the disengaging position along the guide bore 51b and retracts with respect to the first positioning portion 31 and the engaging member 33A is guided toward the engaging position along the guide bore 51a, whereby the speed change stages are changed to the stages (for example, six stages) set by the first positioning portion 31. The operating member 51 is reversely operated to change the speed change stages into, for example, seven stages.

Also, a third embodiment shown in FIGS. 12 and 13 includes a cylindrical positioning member 36 provided at one axial side with engaging portions 31a at a first positioning portion 31 and at the other axial side with engaging portions 32a at a second positioning portion 32.

In this case, an engaging member 33C engageable with each engaging portion 31a or 32a at the first and the second positioning portion 31 or 32 is held by a cylindrical leaf spring 40 having a substantially C-shaped cross-section and having a holding portion 40a extending axially of the spring 40 and fixed to a cover 8 through an engaging projection 40b.

The switching means uses a cylindrical flanged operating member 52, which is provided at the trunk thereof with a guide bore 52a for guiding the engaging member 33C and shifting it axially to selectively engage with the first or the second positioning portion 31 or 32. Also, the operating member 52 is provided with an operating piece 52b, and is rotated thereby to allow the engaging member 33C to move axially of each positioning portion 31 or 32 along the holding portion 40a and selectively engage with the engaging portion 31a or 32a, thereby changing the number of speed change stages set by the positioning mechanism 3.

Alternatively, in the first through third embodiments, as shown in FIGS. 14 through 17, the engaging members 33, 33A, 33B and 33C and springs 4 and 40 for biasing them may be utilized to maintain the lever body 2 in its speed control position by use of friction other than giving the rotational resistance overcoming the return spring at the derailleur to the lever body for maintaining its set position.

Figure 14:
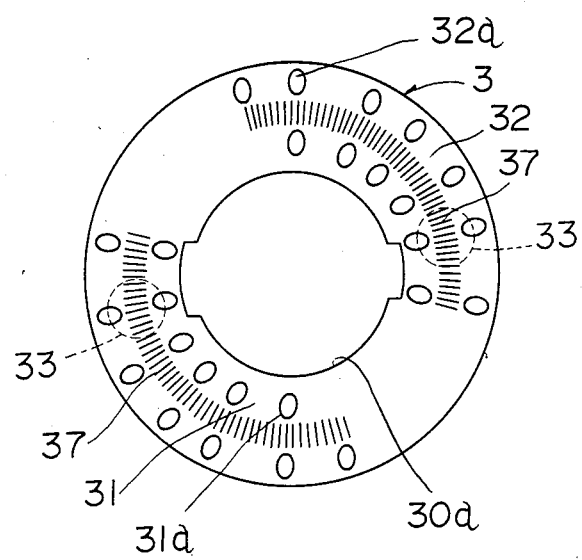
FIG. 14 is a plan view illustrating an improved positioning member in the first embodiment.

In other words, as shown in FIG. 14, at radially intermediate portions between the first and second positioning portions 31 and 32 in the first embodiment are provided friction zone 37 with which the engaging members 33 when shifted radially of the positioning member 30 come into contact, to thereby apply the rotational resistance to the lever body 2.

Accordingly, in this case, when each engaging member 33 is radially shifted to contact with the friction zone 37, the leaf spring 4 deflects to a greater extent to transmit its biasing force to the lever body 2 through the positioning member 31 and support 34, thereby applying the rotational resistance to the lever body 2.

Figure 15:
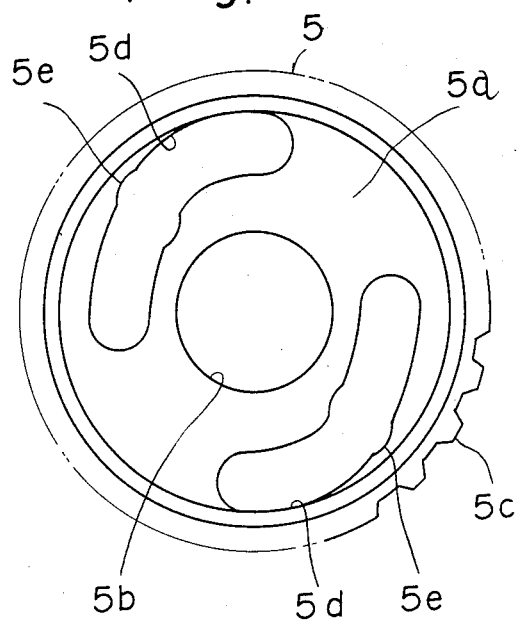
FIG. 15 is a plan view of an operating member used corresponding to the positioning member shown in FIG. 14.

When the friction zones 37 are provided, it is preferable that the operating member 5, as shown in FIG. 15, is provided at an intermediate portion of each guide bore 5d and corresponding to the friction zone 37 with recesses 5e for indicating the position of friction zone 37 via a clicking feel.

Figure 16:
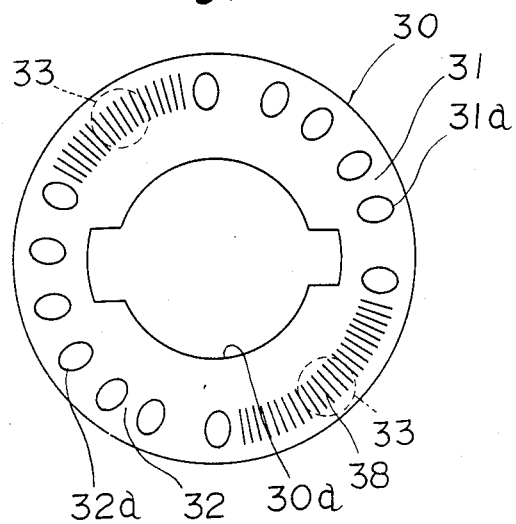
FIG. 16 is a plan view illustrating an improved positioning member in the second embodiment.

Referring to FIG. 16, in the second embodiment, at the circumferential portions between the first and second positioning portions 31 and 32 at the positioning member 30 are provided friction zones 38 with which the engaging members 33, when shifted circumferentially of the positioning member 30, contact respectively, thereby applying the rotational resistance to the lever body 2.

In addition, in a case where the operating member 51 shown in FIG. 11 is used, the friction zones 38 each need only be provided at an intermediate portion between the engaging position and the non-engaging position, in other words, at the radially intermediate portion of the first and second positioning portions 31 and 32.

Figure 17:
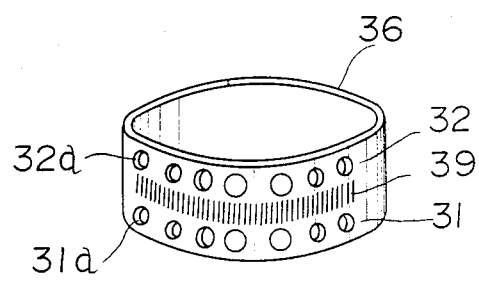
FIG. 17 is a perspective view illustrating improved positioning member in the third embodiment.

Referring further to FIG. 17, a modification of the positioning member 36 in the third embodiment is shown. At an axially intermediate portion between the respective first and second positioning portions 31 and 32 is provided a friction zone 39 with which the engaging member 33C when shifted axially of the positioning member 36 contacts, thereby applying the rotational resistance to the lever body 2.

Figure 18:
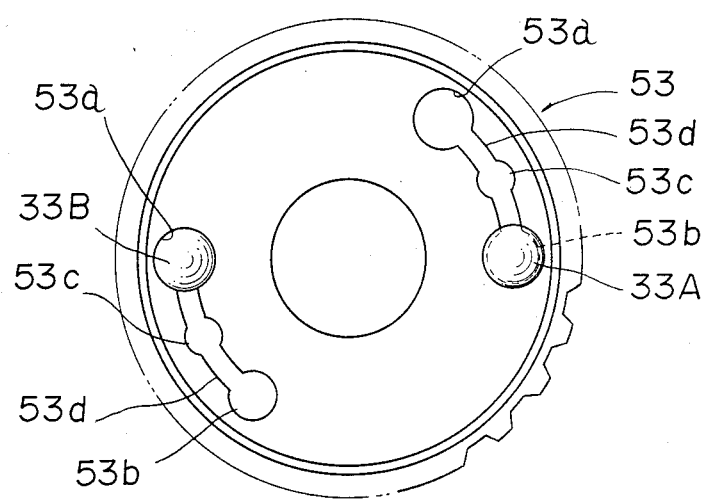
FIG. 18 is a plan view of another example of an operating member used corresponding to the positioning member in the second embodiment.
Figure 19:
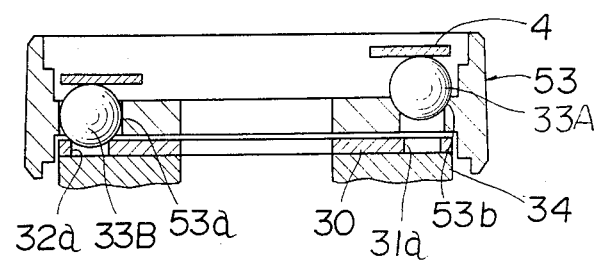
FIGS. 19 and 20 are partial sectional views of the operating member in FIG. 18 incorporated in the second embodiment.

In a case where the positioning member 30 shown in FIG. 10 is used in the second embodiment, other than using the operating member in FIG. 11 constituting the switching means, the operating member 53 shown in FIGS. 18 and 19 is used to apply the rotational resistance to the lever body 2 at an intermediate portion where the operating member 53 is rotated to switch the first and second positioning portions 31 and 32.

Figure 20:
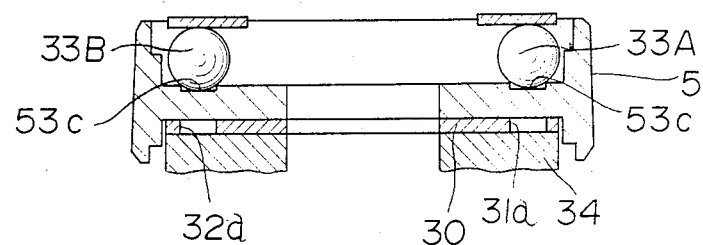

Referring to FIGS. 18 through 20, first and second engaging members 33A and 33B corresponding to the first and second positioning portions 31 and 32 respectively are held by a leaf spring 4 as shown in FIG. 1 to be non-movable circumferentially of the positioning member 30. The operating member 53 has engaging control portions 53a through which the engaging members 33A and 33B can pass to enable engagements thereof with the first and second positioning portions 31 and 32 respectively. Operating member 53 also has engaging control portions 53b which hold the engaging members 33A and 33B to prevent them from passing therethrough and from engaging with the first and second positioning portions 31 and 32 respectively. Operating member 53 also has friction control portions 53c which are formed at the intermediate portions between the respective engaging control portions 53a and 53b and bias the operating member 53 toward the positioning member 30 to thereby apply a rotational resistance to the lever body 2 through the positioning member 30. In addition, in FIG. 18, reference numeral 53c designates a friction setting portion which is positioned at a circumferentially intermediate portion between the respective engaging control portions 53a and 53b and sets a friction control position where the lever body 2 is given the rotational resistance. The engaging control portions 53a, friction setting portions 53c and engaging control portions 53b are continuous or connected to each other through guide grooves 53d smaller in width.

In this embodiment, the engaging control portions 53a and 53b at the operating member 53 constitute a shifting means for shifting the engaging members 33A and 33B to the engaging and disengaging positions with respect to the first and second positioning portions 31 and 32 respectively.

Figure 21:
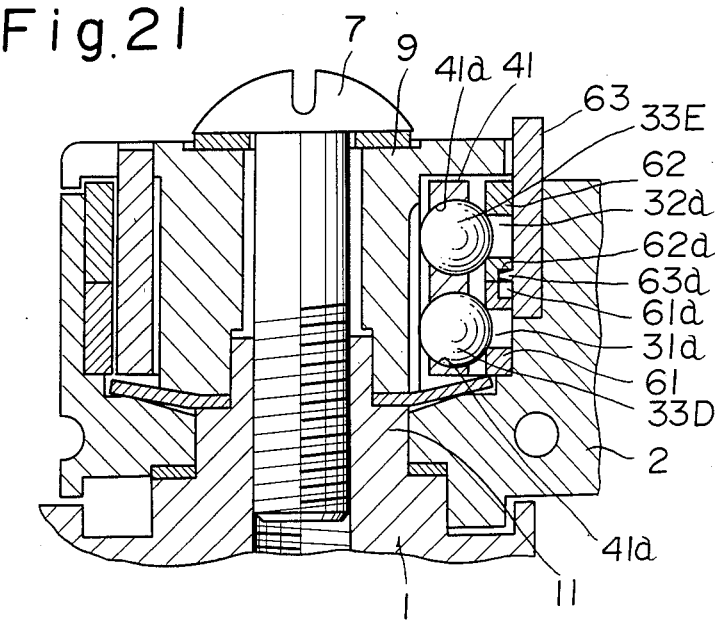
FIGS. 21 is a partial longitudinal sectional view of a fourth embodiment of the invention.
Figure 22:
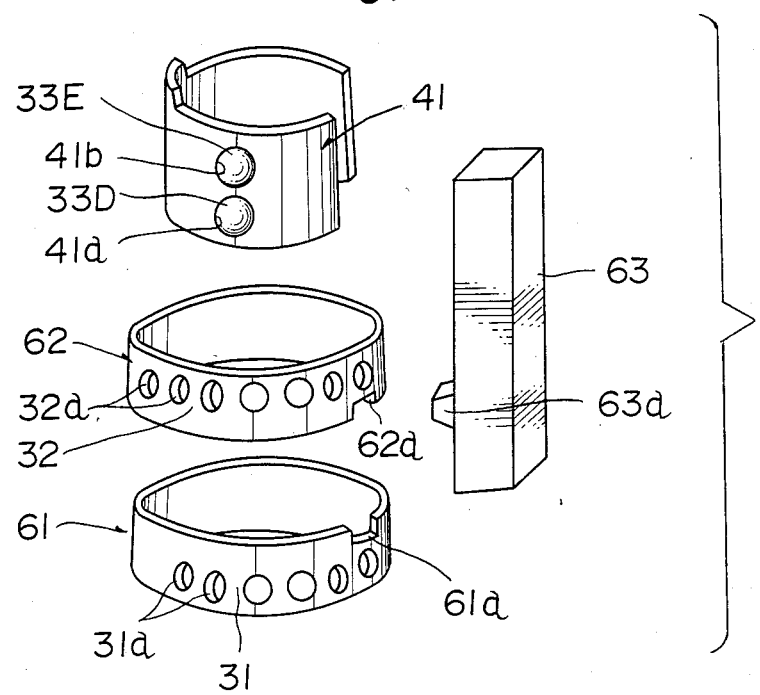
FIG. 22 is a perspective exploded view of the principal portion in the fourth embodiment.

A fourth embodiment shown in FIGS. 21 and 22 comprises a first cylindrical positioning member 61 having a first positioning portion 31, a second cylindrical positioning member 62 having a second positioning portion 32, which are separate from each other, a first engaging member 33D opposite to the first positioning member 61 and engageable with each engaging portion 31a at the first positioning portion 31, and a second engaging member 33E opposite to the second positioning member 62 and engageable with each engaging portion 32a at the second positioning portion 32. A clutch means 63 is used as the switching means, which engages the first or the second positioning member 61 or 62 to rotate it together with the lever body 2.

In detail, the positioning members 61 and 62 are axially aligned and supported rotatably to the lever body 2. The clutch means 63 is supported only axially movably to the lever body 2, whereby a projection 63a at the clutch means 63 engages with a recess 61a or 62a at the positioning member 61 or 62 and the positioning member 61 or 62 which has been engaged by projection 63a rotates together with the lever body 2 to thereby perform the positioning at a desired speed change stage together with the engaging member 33D or 33E.

In addition, the engaging members 33D and 33E are held by a substantially cylindrical leaf spring 41 having a substantially C-shaped cross-section which has holding portions 41a and 41b and fixedly retained to the cover 9 through a retainer 41C, whereby the positioning member 61 or 62 disengaging from the clutch means 63 is stationary.

The fourth embodiment may alternatively use annular plates different in diameter from each other and disposed radially on the same plane, so that a clutch means selectively engages with either one of the annular plates to rotate together with the lever body 2.

Figure 23:
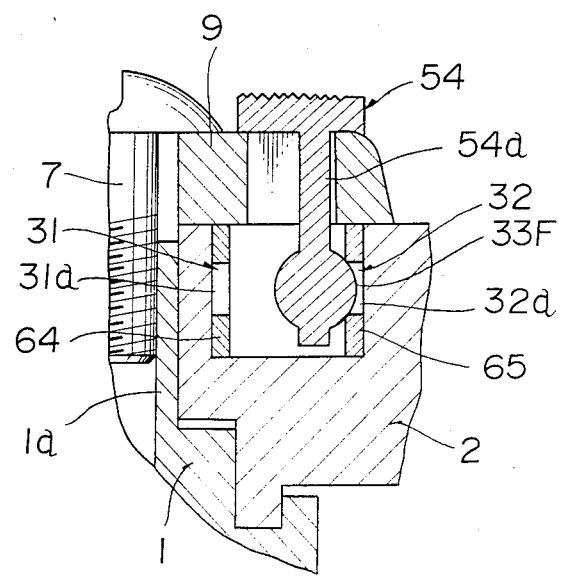
FIG. 23 is a partial sectional view of a fifth embodiment of the invention.

A fifth embodiment shown in FIG. 23 is provided with a first positioning member 64 having a first positioning portion 31 and a second positioning member 65 having a second positioning portion 32, the positioning members 64 and 65 being cylindrical and different in diameter and disposed concentrically in an annular cavity 2a provided in the lever body 2 and supported non-rotatably thereto respectively. An engaging member 33F is interposed between both the positioning members 64 and 65. An operating member 54 constituting the switching means supports the engaging member 33F to be able to move between the first and second positioning members 64 and 65.

The engaging member 33F is integral with the operating member 54 through an elastically displaceable connector 54a. The operating member 54 moves radially to engage the engaging member 33F with the engaging portion 31a or 32a at the first or the second positioning portion 31 or 32, thereby enabling the number of the speed change stages to be changed.

Alternatively, the positioning members 64 and 65 in the fifth embodiment may be ring-shaped and disposed axially opposite to each other so that the engaging member 33F may move axially.

Also, in the fifth embodiment, two engaging members may alternatively be disposed opposite to each other and a positioning member may move therebetween.

Figure 24:
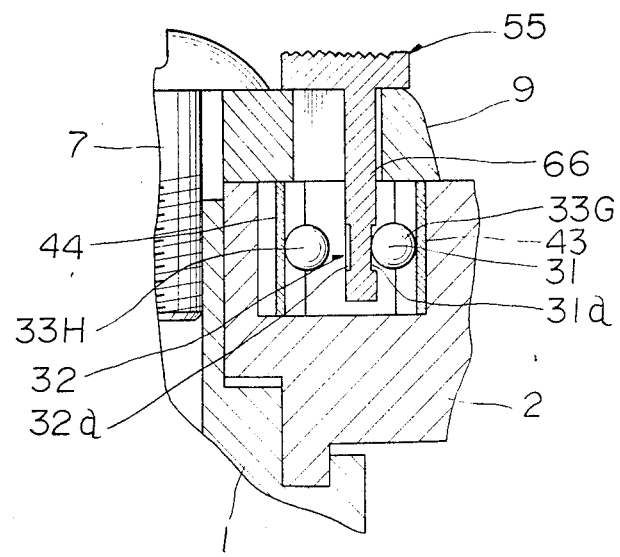
FIG. 24 is a partial sectional view of a modification of the fifth embodiment.

In detail, as shown in FIG. 24, an operating member 55 is provided with a positioning member 66 instead of the engaging member 33F in FIG. 23, the positioning member 66 providing at the surface thereof, for example, a first positioning portion 31 and at the rear surface a second positioning portion 32. A first engaging member 33G opposite to the surface of the positioning member 66 and engageable with each engaging portion 31a at the first engaging portion 31 is supported non-rotatably with respect to the lever body 2 through a leaf spring 43. A second engaging member 33H opposite to the rear surface of the positioning member 66 and engageable with each engaging portion 32a at the second positioning portion 32 is supported with respect to the same through a leaf spring 44. The operating member 55 is operated to shift the positioning member 66 to selectively engage with the first or second engaging member 33G or 33H.

Alternatively, an urging means instead of the engaging member, for example, a holding spring therefor, may be moved for switching. Also alternatively, one of a positioning member provided with a first positioning portion and that provided with a second positioning portion can be disposed opposite to the engaging member and the other may as necessary be switched to the superposed on the one positioning member.

Furthermore, the engaging members each only for first or second positioning portion may be opposite thereto and be operated to be switched to project or retract with respect to the engaging portions respectively.

Also, the aforesaid embodiments except for that in FIG. 24 operate such that the positioning member is rotated in association with and together with the lever body 2 so that the engaging member is supported at the fixing side, which may alternatively be supported and vice versa.

Although several embodiments have been described, they are merely exemplary of the invention and not to be construed as limiting, the invention being defined solely by the appended claims.

What is claimed is:

1. A speed control device for a bicycle, comprising:
   a fixing member;
   a lever body supported rotatably to said fixing member;
   a positioning mechanism provided with (i) a positioning member rotatable integrally with said lever body relative to said fixing member and comprising a first positioning portion having a plurality of engaging portions corresponding to a first number of speed change stages, a second positioning portion having a larger number of engaging portions than said engaging portions of said first positioning portion, said engaging portions of said second positioning portion corresponding to a second number of speed change stages, (ii) at least one engaging member non-rotatable with said lever body and engageable with each of said engaging portions, and (iii) an urging means biasing said engaging member toward said engaging portions; and
   a switching means, for causing said engaging member to selectively engage with one of said first positioning portion and said second positioning portion to change a number of speed change stages set by said positioning mechanism between said first number and said second number.

2. A speed control device for a bicycle according to claim 1, wherein said first positioning portion and said second positioning portion are disposed on said positioning member at different radial positions with respect to an axis of rotation of said lever body, said switching means being provided with an operating member which shifts said engaging member radially of said positioning member to thereby select one of said first positioning portion and said second positioning portion.

3. A speed control device for a bicycle according to claim 2, wherein said positioning member is provided between said first positioning portion and said second positioning portion with a friction zone with which said engaging member when shifted radially contacts to apply a rotational resistance to said lever body.

4. A speed control device for a bicycle according to claim 1, wherein said first positioning portion and said second positioning portion are disposed on said positioning member at circumferentially spaced positions thereof with respect to an axis of rotation of said lever body, said switching means being provided with an operating member which shifts said engaging member circumferentially of said positioning member to thereby select one of said first positioning portion and said second positioning portion.

5. A speed control device for a bicycle according to claim 4, wherein said positioning member is provided between said first positioning portion and said second positioning portion with a friction zone with which said engaging member when shifted circumferentially of said positioning member contacts to apply a rotational resistance to said lever body.

6. A speed control device for a bicycle according to claim 1, wherein said switching means is provided with shifting means for shifting said engaging member between an engaging position and a disengaging position with respect to said first positioning portion and said second positioning portion.

7. A speed control device for a bicycle according to claim 6, wherein said first positioning portion and said second positioning portion are disposed on said positioning member at circumferentially spaced positions thereof with respect to an axis of rotation of said lever body, said speed control device further comprising a first engaging member opposite to said first positioning portion and a second engaging member opposite to said second positioning portion, and said shifting means shifts said first engaging member and said second engaging member between the engaging position and the disengaging position with respect to said first positioning portion and said second positioning portion.

8. A speed control device for a bicycle according to claim 7, wherein said switching means is provided with an operating member for shifting said first engaging member and said second engaging member between the engaging position and the disengaging position with respect to said first positioning portion and said second positioning portion, said operating member being provided with a first engaging control portion and a second engaging control portion which shift said first engaging member and said second engaging member between the engaging position and the disengaging position, and at an intermediate porton between said first control portion and said second control portion with a friction control portion which urges said operating member onto said positioning member to apply a rotational resistance to said lever body.

9. A speed control device for a bicycle according to claim 8, further comprising a friction control portion which urges said operating member to said positioning member to apply a rotational resistance to said lever body.

10. A speed control device for a bicycle according to claim 8, wherein said operating member is provided at an intermediate portion between said engaging control portions with a friction control portion which urges said operating member to said positioning member to apply a rotational resistance to said lever body.

11. A speed control device for a bicycle according to claim 1, wherein said positioning member comprises a cylindrical member, said first and second positioning portions are displaced axially of said positioning member, said switching means being provided with an operating member which shifts said engaging member axially of said positioning member to thereby select one of said first positioning portion and said second positioning portion.

12. A speed control device for a bicycle according to claim 11, wherein said positioning member is provided between said first positioning portion and said second positioning portion with a friction zone with which said engaging member when shifted axially of said positioning member contacts to apply a rotational resistance to said lever body.

13. A speed control device for a bicycle according to claim 1, wherein said positioning member is provided with a first positioning member having said first positioning portion, a second positioning member having said second positioning portion, at least one engaging member opposite to said first positioning member and engageable with each of said engaging portions at said first positioning portion, and at least one second engaging member opposite to said second positioning member and engageable with each of said engaging portions at said second positioning portion, and wherein said switching means is provided with a clutch means which is engageable with one of said first positioning member and said second positioning member together with said lever body.

14. A speed control device for a bicycle according to claim 1, wherein said positioning member is provided with a first positioning member having said first positioning portion and a second positioning member having said second positioning portion, said first positioning member and said second positioning member being disposed opposite to each other and said engaging member being disposed therebetween, said switching means being provided with a moving means for moving said engaging member between said first positioning member and said second positioning member.

15. A speed control device for a bicycle according to claim 1, wherein said switching means is provided with a shifting means for shifting said positioning member with respect to said engaging member between an engaging position and a disengaging position where said first engaging portion and said second engaging portion engage with or disengage from said engaging member.

16. A speed control device for a bicycle according to claim 15, wherein said positioning member comprises a platelike member, said first positioning portion and second positioning portion are disposed at both sides of said positioning member, at least one first engaging member opposite to the surface of said positioning member and engageable with each of said engaging portions at said first positioning portion and at least one second engaging member opposite to the rear surface of said positioning member and engageable with each of said engaging portions at said second positioning member are provided, and said switching means is provided with said shifting means for shifting said positioning member toward one of said first engaging member and said second engaging member.

17. A speed control device for a bicycle, comprising:
a fixing member adapted to be fixed to a frame of the bicycle,
a lever body supported rotatably to said fixing member,
a positioning mechanism comprising means for enabling said speed control device to be used with a first mutlistage sprocket assembly having a first number of speed change stages and a second multistage sprocket assembly having a second number of speed change stages, said second number of speed change stages being larger than said first number of speed change stages, said means for enabling comprising (i) a positioning member rotatable integrally with said lever body relative to said fixing member and comprising a first positioning portion having a plurality of engaging portions corresponding to said first number of speed change stages and a second positioning portion having a plurality of engaging portions corresponding to said second number of speed change stages, (ii) at least one engaging member non-rotatable with said lever body and engageable with each of said engaging portions, and (iii) an urging means biasing said engaging member toward said engaging portions, and
a switching means for causing said engaging member to selectively engage with one of said first positioning portion and said second positioning portion to change a number of speed change stages set by said positioning mechanism between said first number and said second number.

* * * * *